(12) United States Patent
Wei et al.

(10) Patent No.: US 12,399,651 B2
(45) Date of Patent: Aug. 26, 2025

(54) METHOD FOR INSTRUCTION TRANSMISSION FOR MEMORY DEVICES AND STORAGE SYSTEM

(71) Applicant: INNOGRIT TECHNOLOGIES CO., LTD., Shanghai (CN)

(72) Inventors: Tao Wei, Shanghai (CN); Moyang Chen, Shanghai (CN); Jie Chen, Shanghai (CN)

(73) Assignee: INNOGRIT TECHNOLOGIES CO., LTD., Shanghai (CN)

( * ) Notice: Subject to any disclaimer, the term of this patent is extended or adjusted under 35 U.S.C. 154(b) by 0 days.

(21) Appl. No.: 18/344,591

(22) Filed: Jun. 29, 2023

(65) Prior Publication Data

US 2024/0004586 A1 Jan. 4, 2024

(30) Foreign Application Priority Data

Jul. 1, 2022 (CN) .......................... 202210779314.0

(51) Int. Cl.
*G06F 3/06* (2006.01)
*G06F 12/02* (2006.01)

(52) U.S. Cl.
CPC .......... *G06F 3/0659* (2013.01); *G06F 3/0611* (2013.01); *G06F 3/0679* (2013.01); *G06F 12/0246* (2013.01); *G06F 3/0658* (2013.01)

(58) Field of Classification Search
CPC ...... G05B 13/00–048; G05B 15/00–02; G05B 17/00–02; G06F 1/00–3296;
(Continued)

(56) References Cited

U.S. PATENT DOCUMENTS 9,003,104 B2 * 4/2015 Joshi ................... G06F 12/0811
711/100
10,459,855 B2 * 10/2019 Chung ................ G11C 11/4076
(Continued)

OTHER PUBLICATIONS

X. Tian, Y. Cheng and B. Liu, "Design of a Scalable Multicast Scheme With an Application-Network Cross-Layer Approach," in IEEE Transactions on Multimedia, vol. 11, No. 6, pp. 1160-1169, Oct. 2009, doi: 10.1109/TMM.2009.2026104. (Year: 2009).*
(Continued)

*Primary Examiner* — Daniel C. Chappell
(74) *Attorney, Agent, or Firm* — HSML P. C.

(57) ABSTRACT

This application provides a method for instruction transmission for memory devices and a storage system. The method includes: screening instruction flow in a controller to be sent to memory devices by using a command match template and an address match template; grouping these instructions without address into a first instruction pool and these instructions with address into a second instruction pool; address screening for the second instruction pool to determine whether there are instructions that can be broadcast in a merged manner in the second instruction pool; when it is determined that the state of the memory device meets requirement and there are instructions that can be broadcast in a merged manner in the first instruction pool and/or the second instruction pool, simultaneously parallel-transmitting the instructions to corresponding memory devices. The application can save address/command time consumption and release more bandwidth for data transmission.

6 Claims, 3 Drawing Sheets

(58) Field of Classification Search
CPC .............. G06F 3/00; G06F 3/06–0689; G06F
5/00–16; G06F 8/00–78; G06F 9/00–548;
G06F 11/00–3696; G06F 12/00–16; G06F
13/00–4295; G06F 15/00–825; G06F
16/00–986; G06F 18/00–41; G06F
17/00–40; G06F 21/00–88; G06F
2009/3883; G06F 2009/45562–45595;
G06F 2015/761–768; G06F 2201/00–885;
G06F 2206/00–20; G06F 2209/00–549;
G06F 2211/00–902; G06F 2212/00–7211;
G06F 2213/00–4004; G06F 2216/00–17;
G06F 2221/00–2153; G06N 3/00–126;
G06N 5/00–048; G06N 7/00–08; G06N
10/00; G06N 20/00–20; G06N
99/00–007; G06T 1/00–60; G06V
30/00–43; G11B 20/00–24; G11B
33/00–1493; G11C 11/00–5692; G11C
13/00–06; G11C 14/00–009; G11C
15/00–06; G11C 16/00–3495; G11C
17/00–18; G11C 2207/00–229; G11C
2216/00–30; H01L 25/00–50; H01L
2225/00–1094; H03M 7/00–707; H04L
9/00–38; H04L 12/00–66; H04L
41/00–5096; H04L 49/00–9094; H04L
61/00–59; H04L 67/00–75
See application file for complete search history.

(56) References Cited

U.S. PATENT DOCUMENTS

| | | | | |
|---|---|---|---|---|
| 10,802,960 | B2* | 10/2020 | Li | G06F 13/16 |
| 11,132,292 | B2* | 9/2021 | Rajgopal | G06F 12/0246 |
| 2011/0161561 | A1* | 6/2011 | Tsai | G06F 12/06 |
| | | | | 711/E12.078 |
| 2012/0210066 | A1* | 8/2012 | Joshi | G06F 12/0888 |
| | | | | 711/E12.017 |
| 2014/0164872 | A1* | 6/2014 | Frickey | G06F 11/1048 |
| | | | | 714/764 |
| 2014/0173174 | A1* | 6/2014 | Frickey | G11C 11/5642 |
| | | | | 711/103 |
| 2014/0192583 | A1* | 7/2014 | Rajan | G11C 7/10 |
| | | | | 365/63 |
| 2015/0169250 | A1* | 6/2015 | Chang | G06F 13/385 |
| | | | | 711/105 |
| 2015/0317080 | A1* | 11/2015 | Porterfield | G06F 3/0679 |
| | | | | 711/103 |
| 2015/0378814 | A1* | 12/2015 | Webb | G06F 3/061 |
| | | | | 714/768 |
| 2016/0070496 | A1* | 3/2016 | Cohen | G06F 3/0644 |
| | | | | 711/103 |
| 2018/0004688 | A1* | 1/2018 | Chung | G06F 13/4068 |
| 2018/0181510 | A1* | 6/2018 | Liu | G06F 13/36 |
| 2018/0246821 | A1* | 8/2018 | Kanno | G06F 12/0246 |
| 2018/0349645 | A1* | 12/2018 | Helmick | G06F 21/60 |
| 2018/0364934 | A1* | 12/2018 | Bahirat | G06F 3/0625 |
| 2019/0188165 | A1* | 6/2019 | Venkatraman | G06F 12/0653 |
| 2021/0064278 | A1* | 3/2021 | Rajgopal | G06F 3/0659 |
| 2021/0173771 | A1* | 6/2021 | Rajgopal | G06F 12/0835 |
| 2021/0294407 | A1* | 9/2021 | Yu | G06F 1/3243 |

OTHER PUBLICATIONS

J. Tapolcai, J. Bíró, P. Babarczi, A. Gulyás, Z. Heszberger and D. Trossen, "Optimal False-Positive-Free Bloom Filter Design for Scalable Multicast Forwarding," in IEEE/ACM Transactions on Networking, vol. 23, No. 6, pp. 1832-1845, Dec. 2015, doi: 10.1109/TNET.2014.2342155. (Year: 2015).*

* cited by examiner

Optimized scheme
(command with address,
e.g., read command)

Optimized scheme
(command without address)

METHOD FOR INSTRUCTION TRANSMISSION FOR MEMORY DEVICES AND STORAGE SYSTEM

CROSS-REFERENCE TO PRIOR APPLICATION

This application claims priority to Chinese Application number CN2022107793140 which is filed on Jul. 1, 2022, the contents of which are incorporated herein by reference.

TECHNICAL FIELD

This application relates to the field of storage technology, and more specifically to a method for instruction transmission for memory devices, and a storage system.

BACKGROUND

Data transmission speed of flash memory interface is getting faster and faster, especially with the release of ONFI5.0, the data transmission speed of the flash memory interface may reach 2400 MT/s or higher in the future.

The transmission signals of the flash memory interface consist of these following signals:
 unidirectional transmission signals: WE_n, RE_n, RE, CLE, ALE, CE0~CE7 (assuming 8 CEs);
 bidirectional transmission signals: DQ0~DQ7, DQS_t, DQS_c.

As requirements on storage capacity increase, so does the amount of flash memory on a single channel, and the resulting time consumption (percentage) for command/address transmission also increases.

The acceleration of the interface data transmission speed is mainly reflected in the reduction of the time for the DATA transmission part (DATA transmission with DQS differential signal transmission), but there is no corresponding reduction in the time for the command/address part.

The command/address part relies on WE_n as the corresponding clock sampling signal, which are not differential signals, so the transmission speed of the command/address part is much lower than that of the data part.

SUMMARY OF THE INVENTION

An object of the present application is to provide a method for instruction transmission for memory devices and a storage system, which can save address/command time consumption and release more bandwidth for data transmission.

The application discloses a method for instruction transmission for memory devices, which comprises:
 screening instruction flow in a controller to be sent to memory devices by using a command match template and an address match template;
 grouping these instructions without address into a first instruction pool and these instructions with address into a second instruction pool;
 address screening for the second instruction pool to determine whether there are instructions that can be broadcast in a merged manner in the second instruction pool; and
 when it is determined that the states of the memory device meet requirement and there are instructions that can be broadcast in a merged manner in the first instruction pool and/or the second instruction pool, simultaneously parallel-transmitting the instructions to corresponding memory devices.

In one embodiment, when screening the instruction flow in the controller to be sent to the memory devices by using the command match template and the address match template, determining whether the instructions in the instruction flow support broadcast, and grouping these instructions that support broadcast, and immediately transmitting these instructions that do not support broadcast to the memory devices, wherein the command match template and the address match template are configured by software.

In one embodiment, the instructions include commands and addresses, and grouping these instructions without addresses into the first instruction pool and these instructions with addresses into the second instruction pool.

In one embodiment, when there are no instructions that can be broadcast in a merged manner in the first instruction pool and/or the second instruction pool, immediately transmitting the instructions to corresponding memory devices.

In one embodiment, the states of the memory devices meeting the requirement comprises: all or part of the memory devices are in ready state or idle state.

The application also discloses a storage system, which comprises:
 a plurality of memory devices; and
 a memory controller coupled to the memory devices, the memory controller comprises:
  a screening module, configured to screen instruction flow in a controller to be sent to the memory devices by using a command match template and an address match template;
  a grouping module, configured to group these instructions without address into a first instruction pool and these instructions with address into a second instruction pool;
  an address screening module, configured to address screen for the second instruction pool to determine whether there are instructions that can be broadcast in a merged manner in the second instruction pool;
  a broadcast determination module, configured to determine that the states of the memory devices meet requirement and there are instructions that can be broadcast in a merged manner in the first instruction pool and/or the second instruction pool; and
  a broadcast transmitting module, configured to simultaneously parallel-transmitting the instructions to corresponding memory devices when it is determined that the states of the memory devices meet requirement and there are instructions that can be broadcast in a merged manner in the first instruction pool and/or the second instruction pool.

In one embodiment, when the screening module screens the instruction flow in the controller to be sent to the memory device by using the command match template and the address match template, determine whether the instructions in the instruction flow support broadcast, and transmit these instructions that support broadcast to the grouping module and immediately transmit these instructions that do not support broadcast to the memory devices, wherein the command match template and the address match template are configured by software.

In one embodiment, the instructions include commands and an addresses, and the grouping module groups these instructions without addresses into the first instruction pool and these instructions with addresses into the second instruction pool.

In one embodiment, the system further comprises: a memory device state monitoring module that is configured to monitor the states of the memory devices.

In one embodiment, the states of the memory devices meeting the requirement comprises: all or part of the memory devices are in ready state or idle state.

Compared with the prior art, the application has at least the following beneficial effects:

The application can save address/command time consumption and release more bandwidth for data transmission. The interval between the command/address part and the address part needs to be larger than a certain threshold (the interval threshold during read operation is denoted as tR, and the interval threshold during write operation is denoted as tADL). If it is sent in the form of broadcast, the time consumption of the command/address part can be saved, and in some cases, the waiting time for tR and tADL can also be saved, thereby reducing the additional overhead caused by transmitting the address/command part and improving the data transmission efficiency of the flash memory interface bus. This scheme does not require software intervention and does not require NAND chip upgrade support. Moreover, the more the number of CEs on the channel, the more significant the efficiency improvement.

A large number of technical features are described in the specification of the present application, and are distributed in various technical solutions. If combinations (i.e., a technical solutions) of all possible technical features of the present application are listed, the specification may be made too long. In order to avoid this problem, the various technical features disclosed in the above summary of the present application, the technical features disclosed in the various embodiments and examples below, and the various technical features disclosed in the drawings can be freely combined with each other to constitute various new technical solutions (all of which are considered to have been described in this specification), unless a combination of such technical features is not technically feasible. For example, features A+B+C are disclosed in one example, and features A+B+D+E are disclosed in another example, while features C and D are equivalent technical means that perform the same function, and technically only choose one, not to adopt at the same time. Feature E can be combined with feature C technically. Then, the A+B+C+D scheme should not be regarded as already recorded because of the technical infeasibility, and A+B+C+E scheme should be considered as already documented.

DETAILED DESCRIPTION

In the following description, numerous technical details are set forth in order to provide the readers with a better understanding of the present application. However, those skilled in the art can understand that the technical solutions claimed in the present application can be implemented without these technical details and various changes and modifications based on the following embodiments.

In order to make the objects, technical solutions and advantages of the present application more clear, embodiments of the present application will be further described in detail below with reference to the accompanying drawings.

Figure 1:
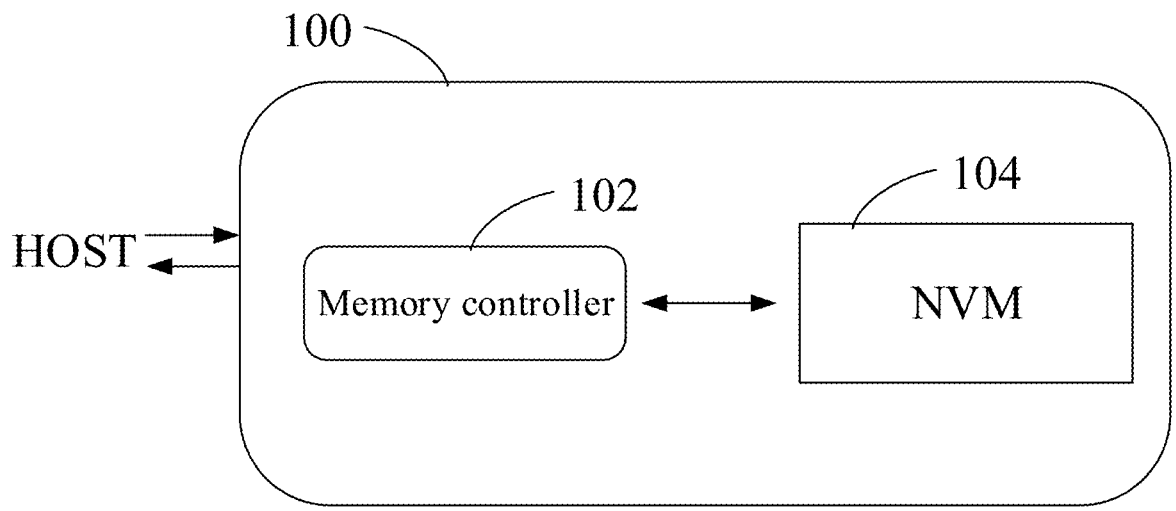
FIG. 1 schematically illustrates a block diagram of a storage system according to an embodiment of the present application.
Figure 2:
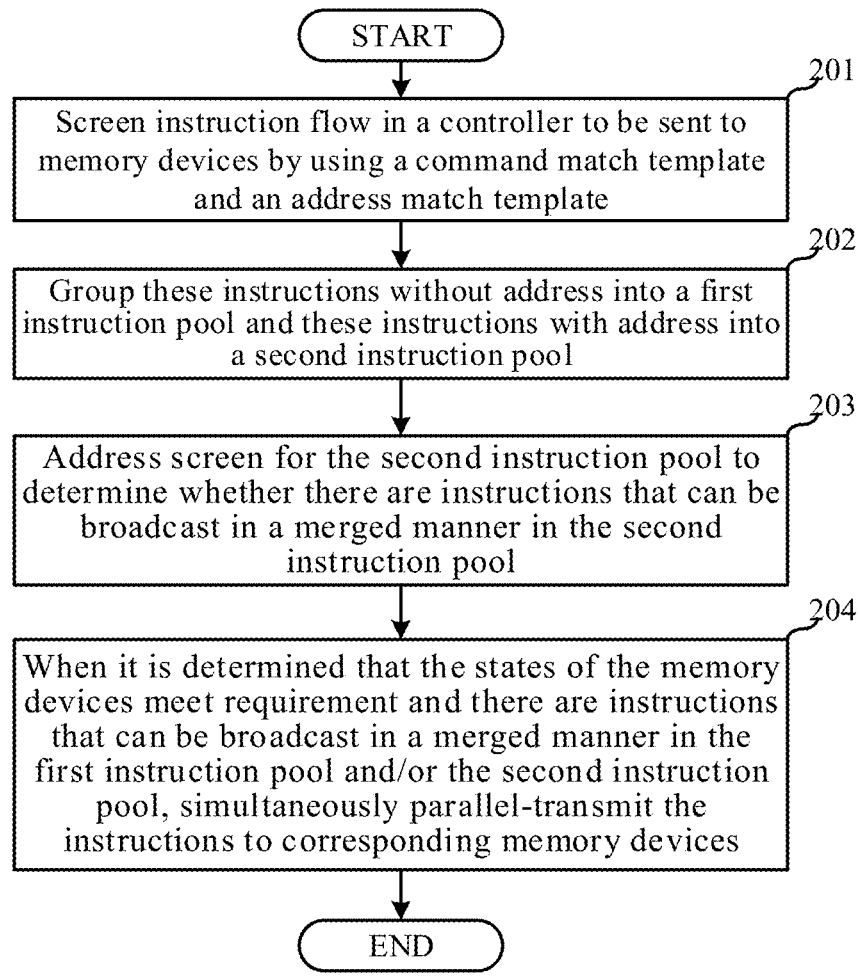
FIG. 2 schematically illustrates a flowchart of a method for instruction transmission for memory devices according to an embodiment of the application.

The present disclosure provides apparatus, systems, and methods for instruction transmission for memory devices to read data stored in non-volatile memory (NVM) storage devices encoded with error correction code (ECC) (e.g., Turbo, low density parity check (LDPC), and polar codes, etc.). FIG. 1 schematically illustrates a non-volatile memory system 100 according to an embodiment of the present disclosure. The non-volatile memory system 100 may include a non-volatile memory controller 102 and a non-volatile memory device 104. When the non-volatile storage system 100 is connected to a host, the non-volatile storage system may provide data storage and/or access to the stored data for the host. The non-volatile memory device 104 may be a non-volatile memory (NVM) based memory device, for example, a NAND device. It should be noted that the non-volatile storage system 100 may include a plurality of non-volatile storage devices, and the non-volatile storage device 104 may be denoted as representative of the plurality of non-volatile storage devices. FIG. 2 schematically shows a flowchart for the instruction transmission for the memory devices according to an embodiment of the present disclosure, which includes the following steps:

At step 201, the instruction flow in the controller to be sent to the memory devices is screened by using a command match template and an address match template.

In one embodiment, when screening the instruction flow in the controller to be sent to the memory devices by using the command match template and the address match template, determining whether the instructions in the instruction flow support broadcast, and grouping these instructions that support broadcast and immediately transmitting these instructions that do not support broadcast to the memory devices. Wherein the command match template and the address match template are configured by software.

At step 202, instructions without addresses are grouped into a first instruction pool and instructions with addresses are grouped into a second instruction pool. In one embodiment, the instructions include a command and an address, with instructions without an address being grouped into the first instruction pool and instructions with an address being grouped into the second instruction pool.

At step 203, address screening is performed on the second instruction pool to determine whether there are instructions that can be broadcast in a merged manner in the second instruction pool.

At Step 204, when it is determined that the states of the memory devices meet the requirement, and there are instructions that can be broadcast in a merged manner in the first instruction pool and/or the second instruction pool, simultaneously parallel-transmitting the instructions to corresponding memory devices.

In one embodiment, when there are no instructions that can be broadcast in a merged manner in the first instruction pool and/or the second instruction pool, immediately transmitting the instructions to corresponding memory devices.

In one embodiment, the states of the memory devices meeting the requirement comprises: all or part of the memory devices are in ready state or idle state. For example, if they are to read data or to write data or erase instructions, waiting until the NANDs to be forwarded are all in READY state (fully optimization). Of course, in other embodiments of the present application, it is also possible to only transmit to part of the NANDs in READY state (partial optimization). For example, assuming that the NANDs on only 2 or 3 channels among the 4 channels are in READY state, the present application may firstly transmit the instructions to the NANDs on the 2 or 3 channels.

Figure 3:
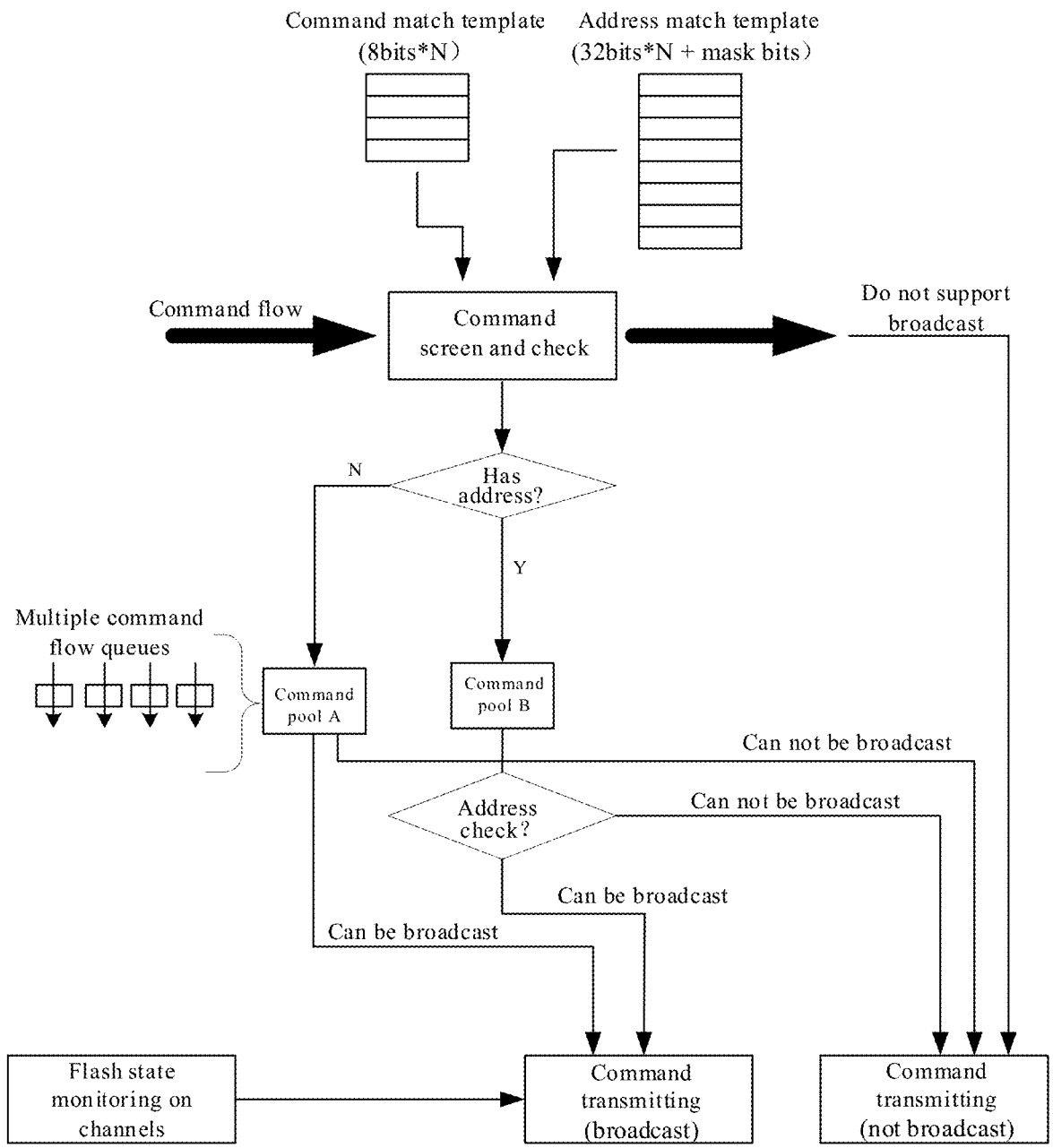
FIG. 3 schematically illustrates a more detailed flowchart of a method for instruction transmission for memory devices according to an embodiment of the present application.

FIG. 3 schematically shows a more detailed flowchart of a method for instruction transmission for memory devices according to an embodiment of the present application. Firstly, using the command match template and the address match template to initial screen will reduce the size of space for later search (this step is optional). The command flow is type filtered and grouped. According to whether the command has an address, the command is grouped into different command pools. If it does not have an address, it is grouped into command pool A, and if it has an address, it is grouped into command pool B. If the command does not have an address, then the address check will not be performed. If the command has an address, the address check will be performed. Therefore, the broadcast condition of the command pool B needs to join the address check.

Figure 4:
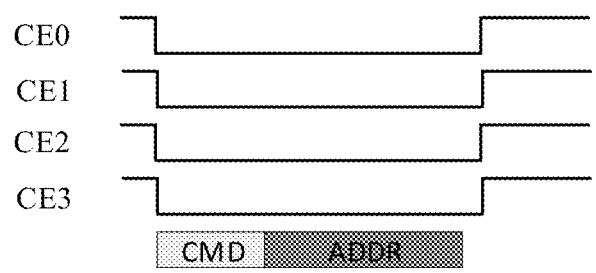
FIG. 4 schematically illustrates a schematic diagram of an instruction transmission process according to an embodiment of the present application.
Figure 4:
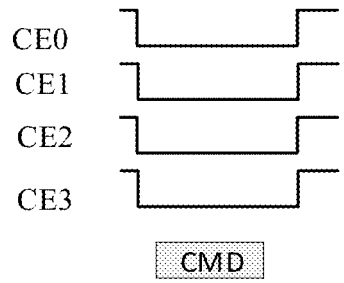

FIG. 4 is an example of the instruction transmission process of the present application. For example, the transmission speed during the read operation is 18K (3200 MT/s), the time for data transmission part is 5760 ns, and the typical time taken for the 00-32/30 read operation is about 100 ns. At this time, if four CEs can be broadcast, the efficiency can be improved by a rough estimate of 5.2=300/5760.

Furthermore, the flash chip states on the channels are collected, and when the channel chip states meet the requirement and there are accumulated commands in the command pool queue that can be broadcast in a merged manner, command broadcast is performed. During the command broadcast, multiple chips on the channels may receive the commands and addresses (if there is an address) at the same time.

The present disclosure also provides a storage system according to another embodiment of the present application, the storage system comprises: a plurality of memory devices and a memory controller coupled to the plurality of memory devices. The memory controller includes a screening module, a grouping module, an address screening module, a broadcast determination module, a broadcast transmitting module, and a memory device state monitoring module.

The screening module is configured to screen instruction flow in a controller to be sent to the memory devices by using a command match template and an address match template. In one embodiment, when the screening module screens the instruction flow in the controller to be sent to the memory devices by using the command match template and the address match template, determine whether the instructions in the instruction flow support broadcast, and transmit these instructions that support broadcast to the grouping module and immediately transmit these instructions that do not support broadcast to the memory devices, wherein the command match template and the address match template are configured by software.

The grouping module is configured to group these instructions without address into a first instruction pool and these instructions with address into a second instruction pool. The address screening module is configured to address screen for the second instruction pool to determine whether there are instructions that can be broadcast in a merged manner in the second instruction pool. In one embodiment, one instructions include a command and an address, and the grouping module groups these instructions without an address into the first instruction pool and these instructions with an address into the second instruction pool.

The memory device state monitoring module is configured to monitor the states of the memory devices. The broadcast determination module is configured to determine that the states of the memory devices meet requirement and there are instructions that can be broadcast in a merged manner in the first instruction pool and/or the second instruction pool. In one embodiment, the states of the memory devices meeting the requirement comprises: all or part of the memory devices are in ready state or idle state. The broadcast transmitting module is configured to simultaneously parallel-transmit the instructions to corresponding memory devices when it is determined that the states of the memory devices meet requirement and there are instructions that can be broadcast in a merged manner in the first instruction pool and/or the second instruction pool.

It should be noted that in this specification of the application, relational terms such as the first and second, and so on are only configured to distinguish one entity or operation from another entity or operation, and do not necessarily require or imply any such actual relationship or order between these entities or operations. Furthermore, the term "comprises" or "comprising" or "includes" or any other variations thereof is intended to encompass a non-exclusive inclusion, such that a process, method, article, or device that comprises a multiple elements includes not only those elements but also other elements, or elements that are inherent to such a process, method, item, or device. Without further limitation, the fact that an element is qualified by the phrase "includes/comprises a" does not preclude the existence of another identical element in the process, method, article or device that includes the element. In this specification of the application, if it is mentioned that an action is performed according to an element, it means the meaning of performing the action at least according to the element, and includes two cases: the action is performed only on the basis of the element, and the action is performed based on the element and other elements. Multiple, repeatedly, various, etc., expressions include 2, twice, 2 types, and 2 or more, twice or more, and 2 types or more types.

The term "coupled to" and its derivatives can be used herein. "Coupled" may mean that two or more elements are in direct physical or electrical contact. However, "coupled" may also mean that two or more elements are indirectly in contact with each other, but still cooperate or interact with each other, and may mean that one or more other elements are coupled between elements that are said to be coupled to or connected with each other.

All documents mentioned in this specification are considered to be included in the disclosure of this application as a whole, so that they can be used as a basis for modification when necessary. In addition, it should be understood that the above is only a preferred embodiment of the present specification, and is not intended to limit the protection scope of the present specification. Any modification, equivalent replacement, improvement, etc. made within the spirit and principle of one or more embodiments of this specification should be included in the protection scope of one or more embodiments of this specification.

In some cases, the actions or steps described in the claims can be performed in a different order than in the embodiments and still achieve desired results. In addition, the processes depicted in the drawings do not necessarily require the specific order or sequential order shown in order to achieve the desired results. In some embodiments, multitasking and parallel processing are also possible or may be advantageous.

What is claimed is:

1. A method for instruction transmission for memory devices, comprising:
   screening an instruction flow in a controller to be sent to the memory devices by using a command match template and an address match template, wherein the instruction flow comprises a plurality of instructions, each of the plurality of instructions including a command; wherein the command match template and the address match template are configured by software; wherein during screening, determining whether the plurality of instructions in the instruction flow support broadcast, and grouping instructions that support the broadcast, and immediately transmitting, from the controller to the memory devices, instructions that do not support the broadcast to the memory devices; and wherein the memory devices are coupled to a same channel;
   grouping instructions screened by the command match template and the address match template into a first instruction pool for instructions without an address and into a second instruction pool for instructions with an address;
   performing an address screening for the second instruction pool to determine whether there are instructions in the second instruction pool that can be broadcast to the memory devices in a merged manner; and
   when a determination is made that states of the memory devices meet a requirement and there are instructions in either the first instruction pool or the second instruction pool that can be broadcast in the merged manner, the controller broadcasting, to corresponding memory devices of the memory devices, the instructions that can be broadcast from the first instruction pool or the second instruction pool in the merged manner, and then respectively sending data corresponding to each memory device to a corresponding memory device of the memory devices, so as to reduce occupation time of the same channel to transmit the instructions and improve transmission efficiency.

2. The method for instruction transmission according to claim 1, wherein when there are no instructions in the first instruction pool or the second instruction pool that can be broadcast in the merged manner, immediately transmitting the instructions to corresponding memory devices.

3. The method for instruction transmission according to claim 1, wherein the states of the memory devices meeting the requirement comprises: all or a part of the memory devices are in a ready state or an idle state.

4. A storage system, comprising:
   a plurality of memory devices coupled to a same channel; and
   a memory controller coupled to the plurality of memory devices, the memory controller comprises:
   a screening module, configured to screen instruction flow in the memory controller to be sent to the plurality of memory devices by using a command match template and an address match template, wherein the instruction flow comprises a plurality of instructions, each of the plurality of instructions including a command; wherein the command match template and the address match template are configured by software; wherein during screening, determining whether the plurality of instructions in the instruction flow support broadcast, and grouping instructions that support the broadcast, and immediately transmitting instructions that do not support the broadcast to the plurality of memory devices;
   a grouping module, configured to group instructions screened by the command match template and the address match template into a first instruction pool for instructions without an address and into a second instruction pool for instructions with an address;
   an address screening module, configured to perform address screening for the second instruction pool to determine whether there are instructions in the second instruction pool that can be broadcast in a merged manner;
   a broadcast determination module, configured to determine that states of the plurality of memory devices meet a requirement and there are instructions in the first instruction pool or the second instruction pool that can be broadcast in the merged manner; and
   a broadcast transmitting module, configured to perform broadcasting the instructions in the merged manner from either the first instruction pool or the second instruction pool to corresponding memory devices of the plurality of memory devices when the states of the plurality of memory devices meet the requirement and there are instructions that can be broadcast in the merged manner from either the first instruction pool or the second instruction pool, and then respectively sending data for each memory device to a respective memory device of the plurality of memory devices, so as to reduce occupation time of the same channel to transmit the instructions and improve transmission efficiency.

5. The storage system according to claim 4, further comprising: a memory device state monitoring module that is configured to monitor the states of the plurality of memory devices.

6. The storage system according to claim 4, wherein the states of the plurality of memory devices meeting the requirement comprises: all or a part of the plurality of memory devices are in a ready state or an idle state.

* * * * *